United States Patent
Gurnavage

(10) Patent No.: US 9,486,861 B2
(45) Date of Patent: Nov. 8, 2016

(54) APPARATUSES AND METHODS FOR CUTTING A REVERSE SPOT-FACE IN A WORKPIECE

(71) Applicant: The Boeing Company, Huntington Beach, CA (US)

(72) Inventor: Walter F. Gurnavage, Goose Creek, SC (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/481,484

(22) Filed: Sep. 9, 2014

(65) Prior Publication Data

US 2016/0067795 A1    Mar. 10, 2016

(51) Int. Cl.
*B23B 51/10* (2006.01)
*B23B 51/12* (2006.01)

(52) U.S. Cl.
CPC .......... *B23B 51/102* (2013.01); *B23B 51/104* (2013.01); *B23B 2260/12* (2013.01); *Y10T 408/5621* (2015.01); *Y10T 408/5622* (2015.01)

(58) Field of Classification Search
CPC ............ B23B 51/102; B23B 51/104; B23B 2260/12; Y10T 408/5621; Y10T 408/5622
See application file for complete search history.

(56) References Cited

U.S. PATENT DOCUMENTS

| | | | | |
|---|---|---|---|---|
| 1,058,149 A * | 4/1913 | Campbell | ............. | B23B 51/104 408/112 |
| 1,435,502 A * | 11/1922 | Sager | .................... | B23B 51/102 408/101 |
| 2,462,147 A * | 2/1949 | Waller | .................. | B23B 51/102 408/101 |
| 2,495,583 A * | 1/1950 | Heron | ................. | B23B 51/0045 408/180 |

(Continued)

FOREIGN PATENT DOCUMENTS

FR    2659583 A1 *    9/1991    ........... B23B 51/102

OTHER PUBLICATIONS

Webpages from www.skyshop.com.au/ats/CUTTERS.pdf.

*Primary Examiner* — Sunil K Singh
*Assistant Examiner* — Ryan Rufo
(74) *Attorney, Agent, or Firm* — Smith Moore Leatherwood LLP

(57) ABSTRACT

A reverse spot-facing tool for cutting a reverse spot-face in a workpiece using a reverse spot-facing cutter configured to engage a pilot shaft having a first end and a second end is disclosed. The workpiece comprises a through hole having a central axis. The reverse spot-facing tool comprises a stop configured to be located between the first end and the second end of the pilot shaft; a biasing assembly that generates a first thrust force and an equal and opposite second thrust force when the reverse spot-facing cutter is cutting the reverse spot face; and a thrust bearing configured to be positioned between the biasing assembly and the stop. When the reverse spot-facing cutter is cutting the reverse spot-face, the thrust bearing transmits the second thrust force from the biasing assembly to the stop, and the biasing assembly transmits the first thrust force to the workpiece.

15 Claims, 12 Drawing Sheets

(56) References Cited

U.S. PATENT DOCUMENTS

| | | | | | |
|---|---|---|---|---|---|
| 2,548,113 | A | * | 4/1951 | Kruse | B23B 51/102 408/99 |
| 2,608,114 | A | * | 8/1952 | Martin | B23B 51/104 279/155 |
| 2,785,593 | A | * | 3/1957 | Wing | B23B 51/102 408/110 |
| 3,017,791 | A | * | 1/1962 | Fried | B23B 29/03453 408/180 |
| 3,381,579 | A | * | 5/1968 | Vindez | B23B 51/102 408/93 |
| 3,545,311 | A | * | 12/1970 | Messer, Jr. | B23B 51/102 408/113 |
| 4,017,201 | A | * | 4/1977 | Adams | B23B 41/12 144/205 |
| 4,331,410 | A | * | 5/1982 | Schnabel | B25B 27/06 29/402.03 |
| 4,729,699 | A | * | 3/1988 | Frazzoli | B23B 51/102 408/152 |
| 5,848,860 | A | * | 12/1998 | Steiner | B23B 51/102 408/159 |
| 2010/0028097 | A1 | * | 2/2010 | Luepke | B23B 31/083 408/180 |

* cited by examiner

APPARATUSES AND METHODS FOR CUTTING A REVERSE SPOT-FACE IN A WORKPIECE

BACKGROUND

Cutting a reverse spot-face in a workpiece with conventional spot-facing equipment is time consuming, difficult to perform properly, and tiring for the operator. More specifically, it may be difficult to maintain the reverse spot-facing cutter in coaxial alignment with a hole that is to be provided with the reverse spot-face. Furthermore, while cutting the reverse spot-face, pulling force must be continuously exerted by the operator on the pilot shaft of the reverse spot-facing cutter to maintain cutting action. Additionally, the operator must periodically interrupt the cutting process to prevent excessive penetration of the workpiece by the reverse spot-facing cutter.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to a reverse spot-facing tool for cutting a reverse spot-face in a workpiece using a reverse spot-facing cutter configured to engage a pilot shaft having a first end and a second end. The workpiece comprises a through hole having a central axis. The reverse spot-facing tool comprises a stop configured to be located between the first end and the second end of the pilot shaft; a biasing assembly that generates a first thrust force and a second thrust force equal and opposite to the first thrust force when the reverse spot-facing cutter is cutting the reverse spot face; and a thrust bearing configured to be positioned between the biasing assembly and the stop. When the reverse spot-facing cutter is cutting the reverse spot-face, the thrust bearing transmits the second thrust force from the biasing assembly to the stop, and the biasing assembly transmits the first thrust force to the workpiece.

Another example of the present disclosure relates to a reverse spot-facing tool for cutting a reverse spot-face in a workpiece. The workpiece comprises a through hole having a central axis. The reverse spot-facing tool comprises a pilot shaft and a reverse spot-facing cutter configured to be coupled to the pilot shaft. The reverse spot-facing tool also comprises a stop, in turn comprising a first through opening configured to receive the pilot shaft and a lock configured to fix the stop along the pilot shaft. The reverse-spot-facing tool further comprises a thrust bearing and a biasing assembly. The biasing assembly generates a first thrust force and a second thrust force equal and opposite to the first thrust force when the reverse spot-facing cutter is cutting the reverse spot-face. The biasing assembly comprises a workpiece-engaging member comprising a third end configured to face the workpiece, a fourth end opposite the third end and configured to face the stop, and a second through opening extending between the third end and the fourth end. The second through opening is bounded by a first wall. The workpiece-engaging member also comprises a first abutment surface configured to engage the workpiece. The biasing assembly also comprises a stop-engaging member, in turn comprising a fifth end configured to face the workpiece, a sixth end opposite the fifth end and configured to face the stop, and a third through opening extending between the fifth end and the sixth end. The third through opening is bounded by a second wall. The stop-engaging member further comprises a second abutment surface configured to engage the thrust bearing. The thrust bearing is configured to be positioned between the biasing assembly and the stop. The workpiece-engaging member and the stop-engaging member are configured to be adjustably interconnected. When the reverse spot-facing cutter is cutting the reverse spot-face, the thrust bearing transmits the second thrust force from the biasing assembly to the stop, and the biasing assembly transmits the first thrust force to the workpiece.

Yet another example of the present disclosure relates to a method of cutting a reverse spot-face having a depth in a workpiece. The workpiece comprises an obverse side, a reverse side, and a through hole with the central axis. The method comprises installing a pilot shaft in the through hole such that a stop is along the pilot shaft on the obverse side of the workpiece, a biasing assembly is along the pilot shaft between the workpiece and the stop, and a thrust bearing is between the biasing assembly and the stop. The method further comprises attaching a reverse spot-facing cutter to the pilot shaft on the reverse side of the workpiece; biasing the reverse spot-facing cutter against the reverse side of the workpiece with a preload by generating a first thrust force against the obverse side of the workpiece and a second thrust force opposite the first thrust force against the stop by adjusting the biasing assembly; and rotating the reverse spot-facing cutter via the pilot shaft.

BRIEF DESCRIPTION OF THE DRAWINGS

Figure 1A:
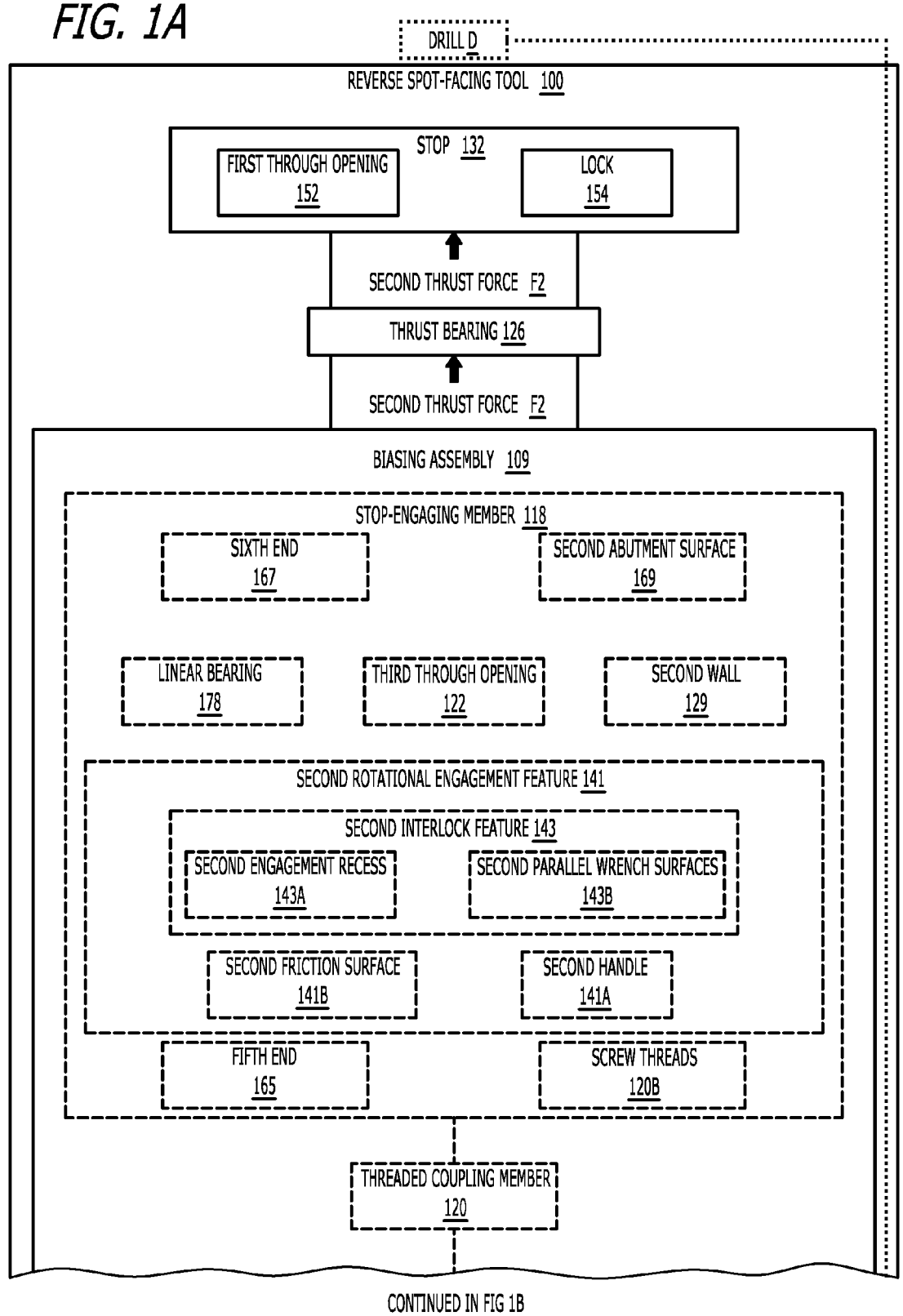
Figure 1B:
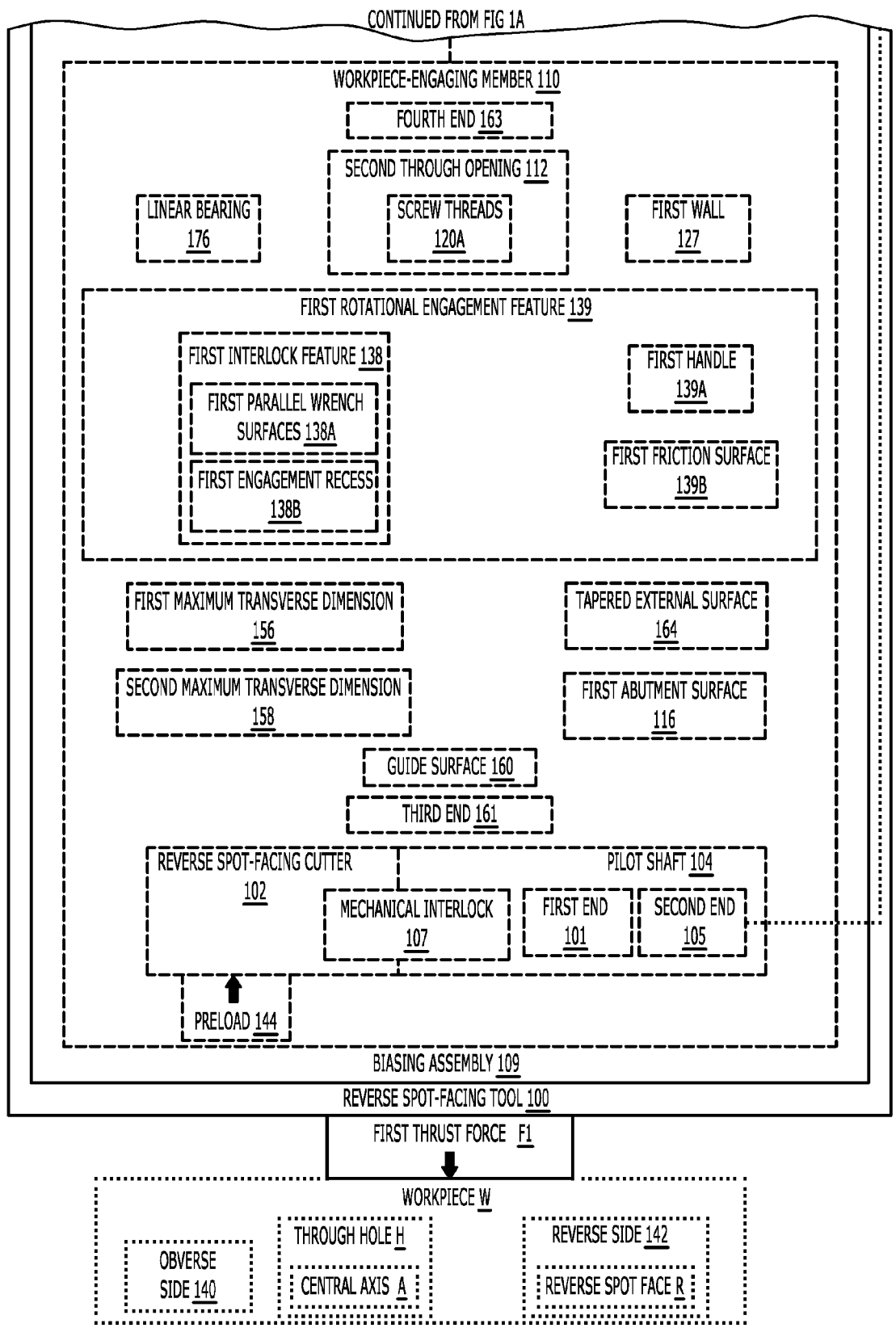
Figure 2:
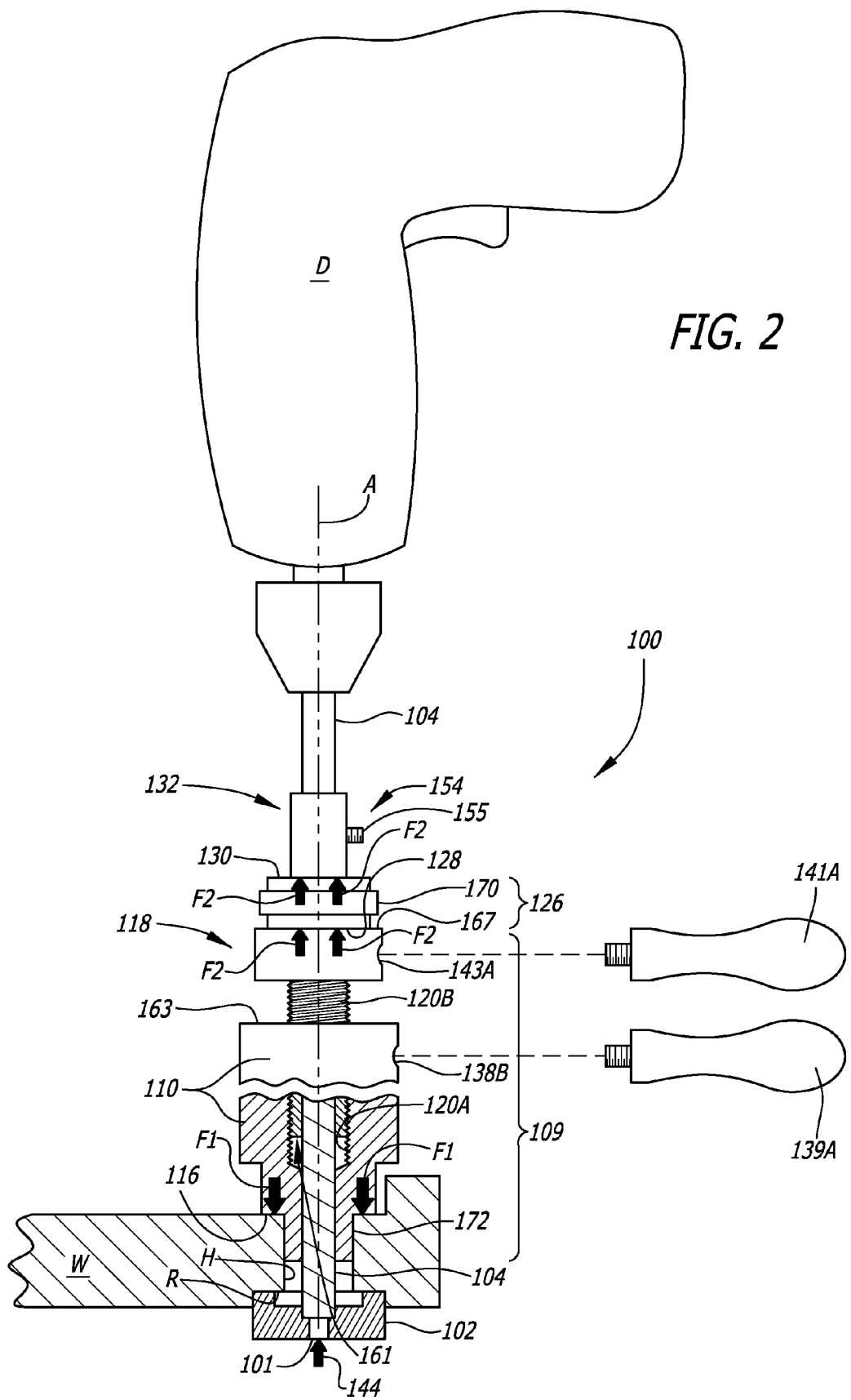
Figure 3A:
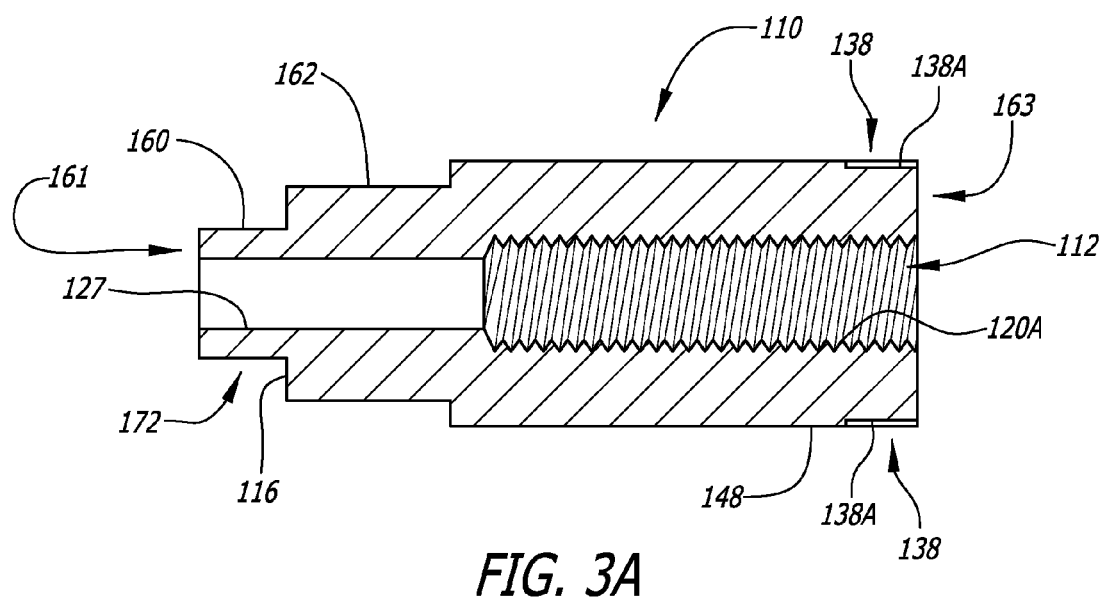
Figure 3B:
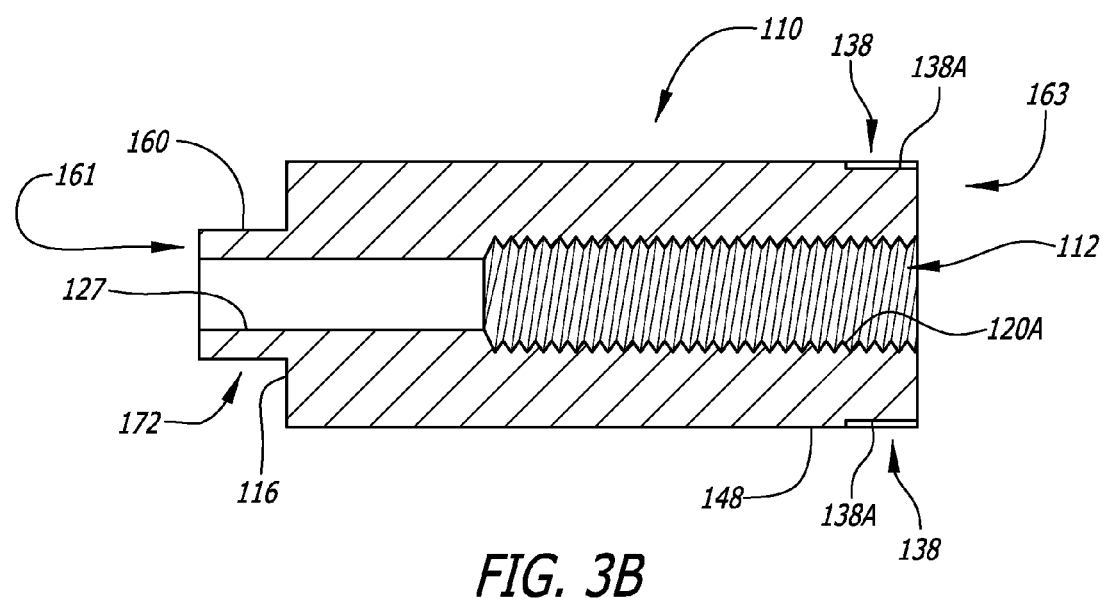
Figure 4A:
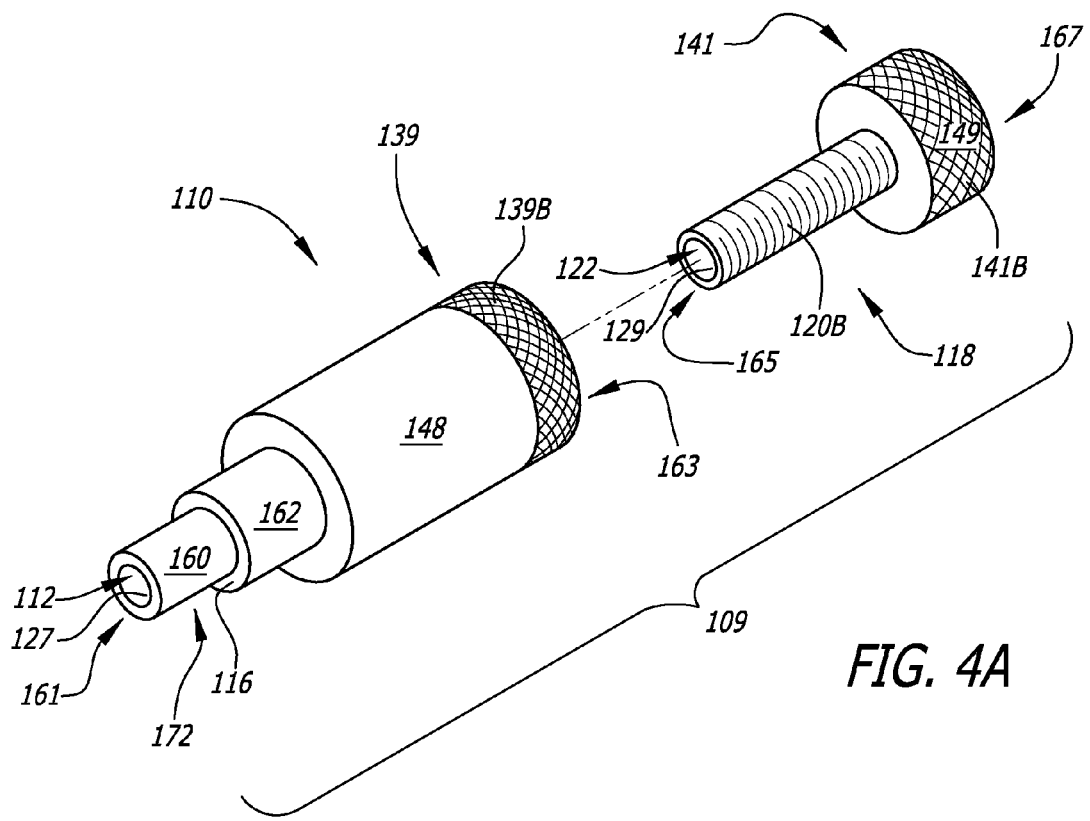
Figure 4B:
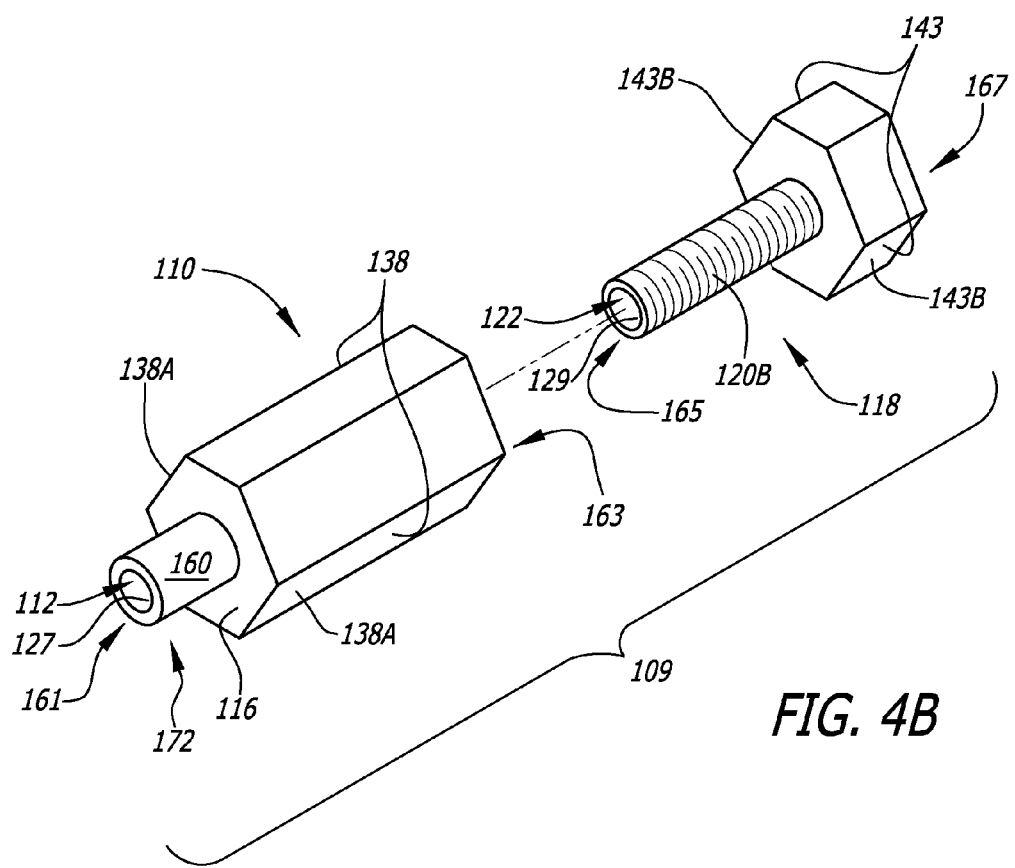
Figure 4C:
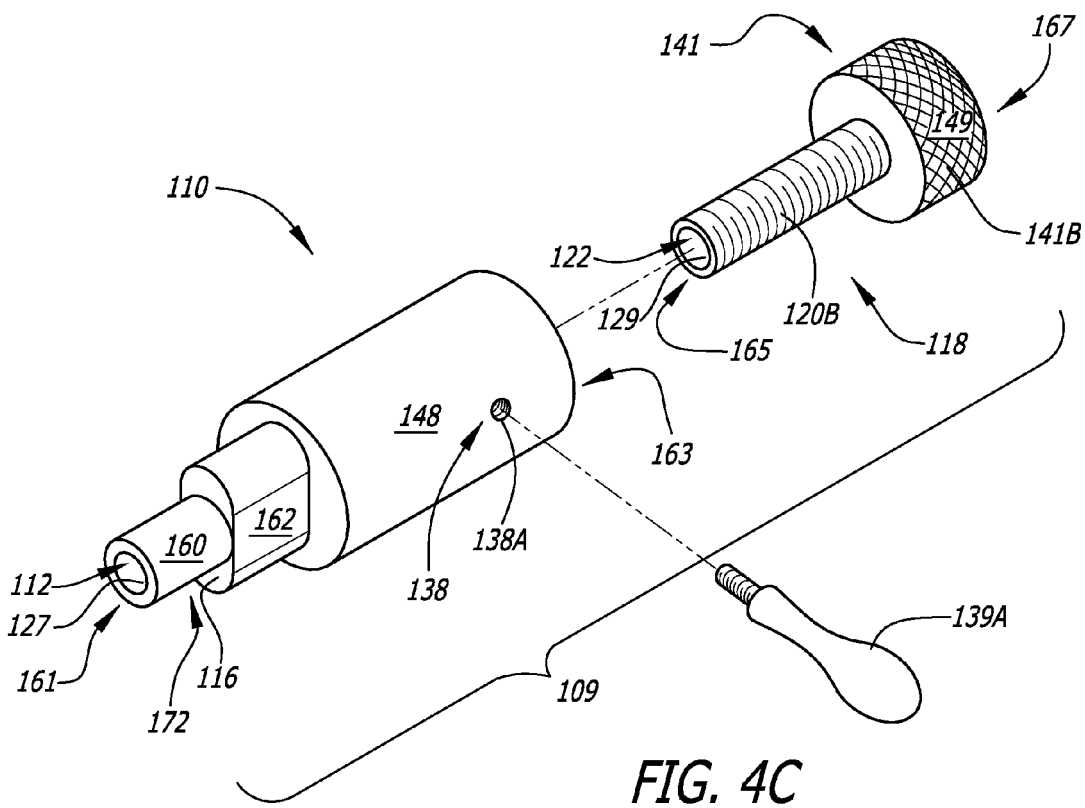
Figure 4D:
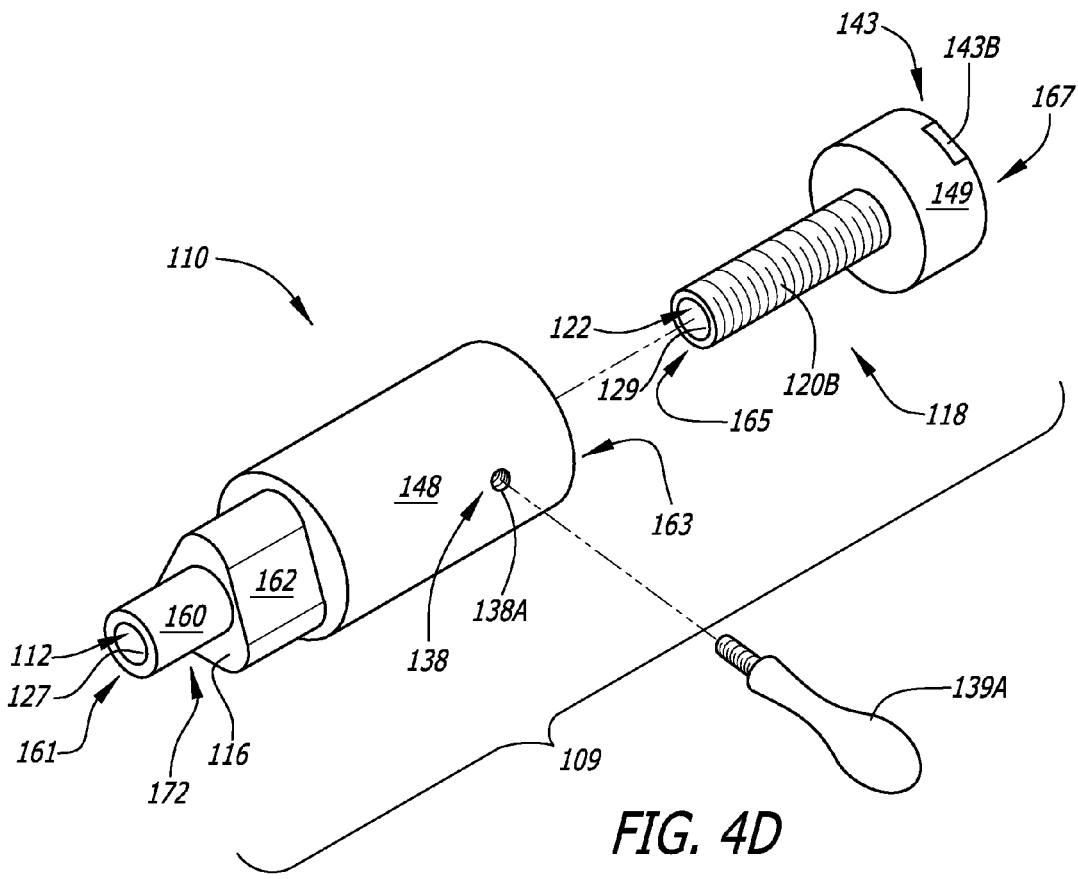
Figure 5:
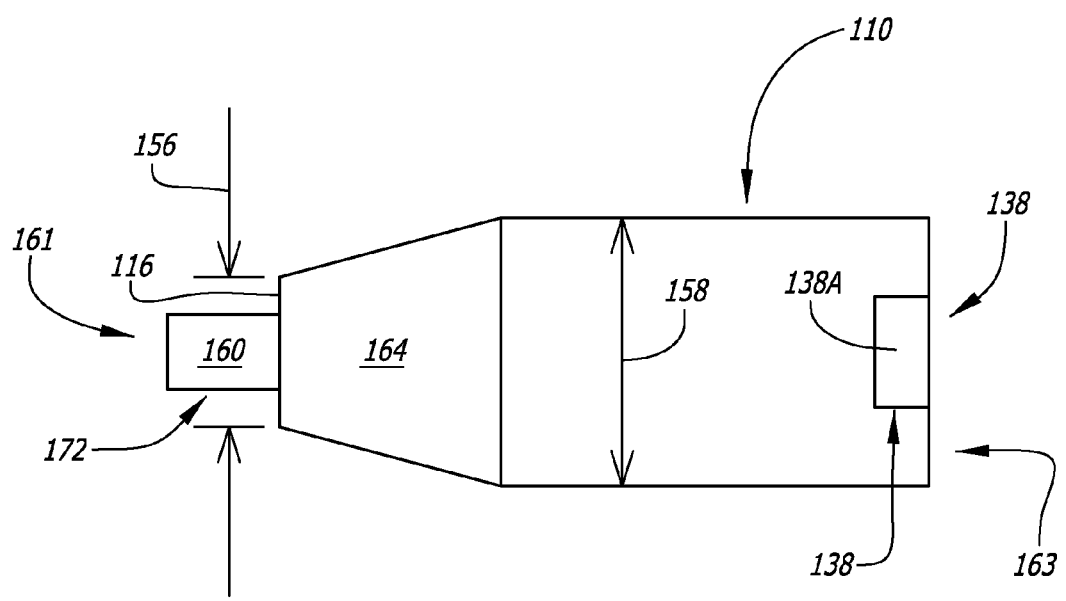
Figure 6:
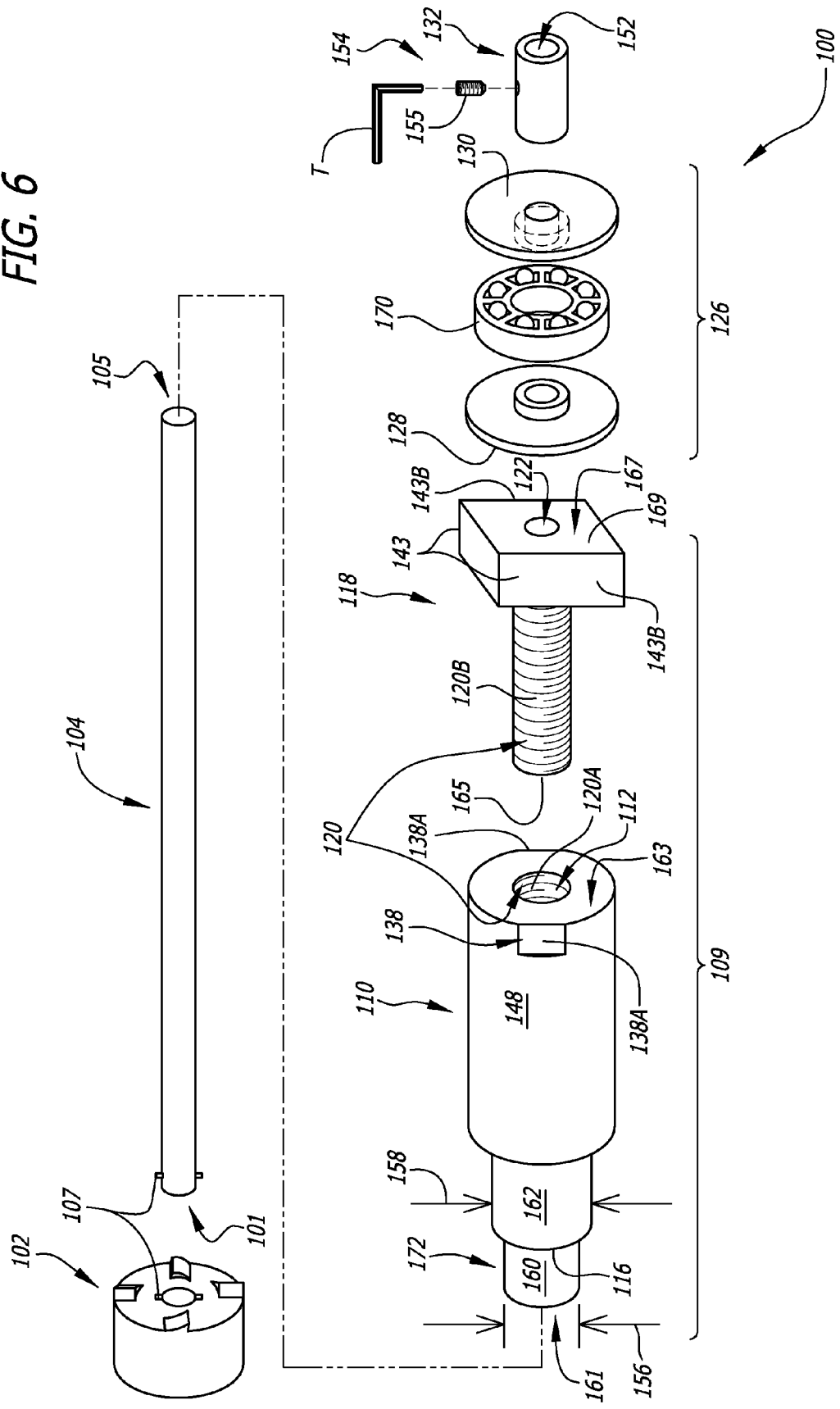
Figure 7:
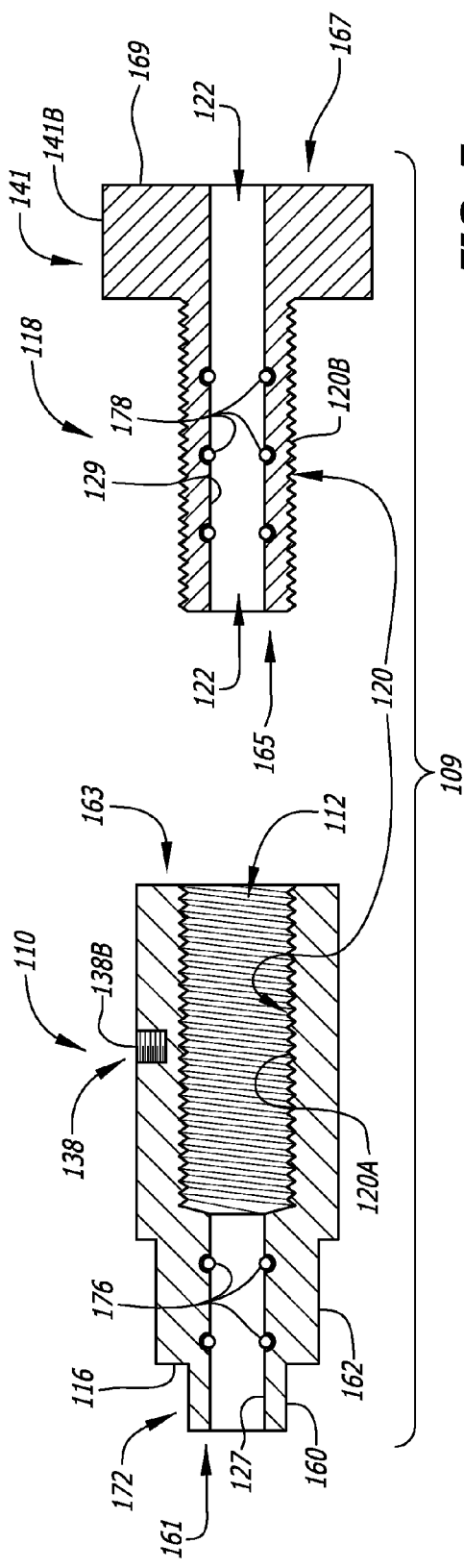
Figure 8:
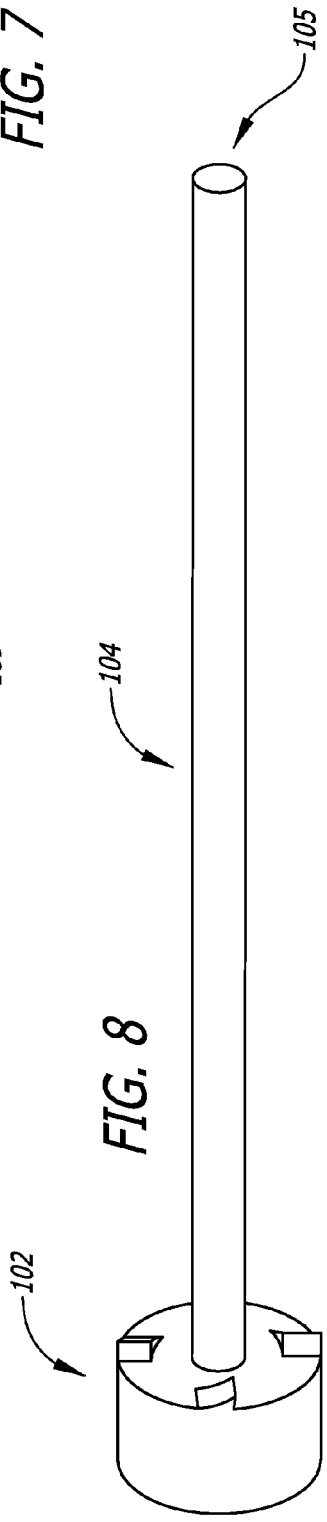
Figure 9:
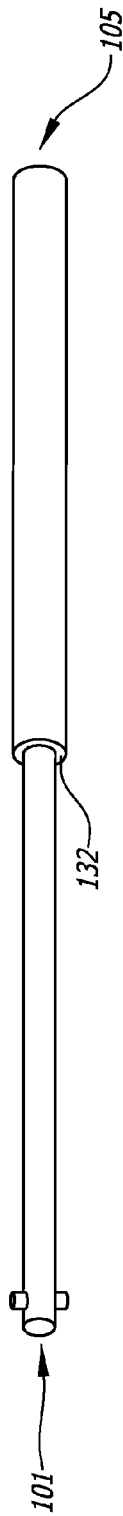
Figure 10:
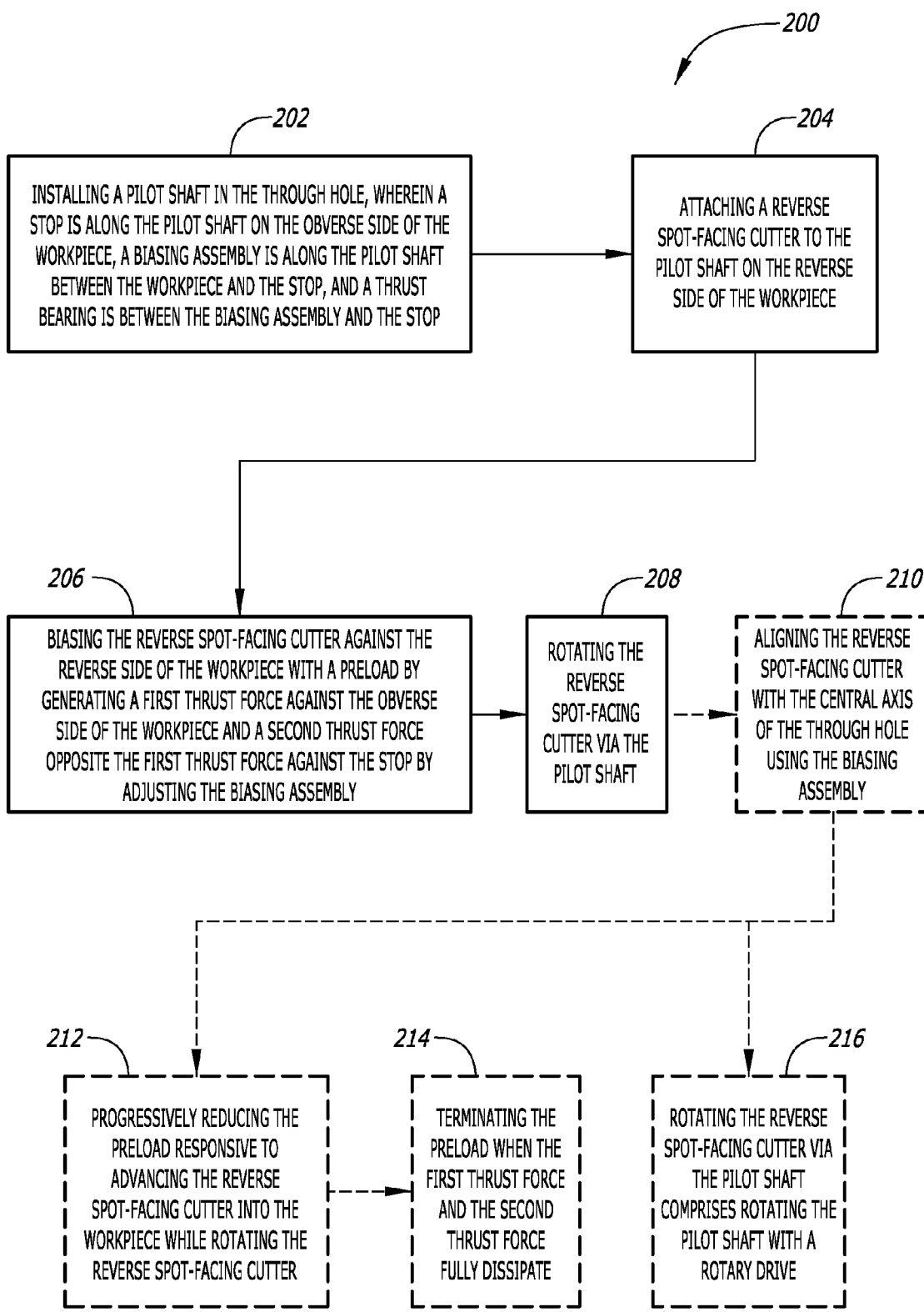
Figure 11:
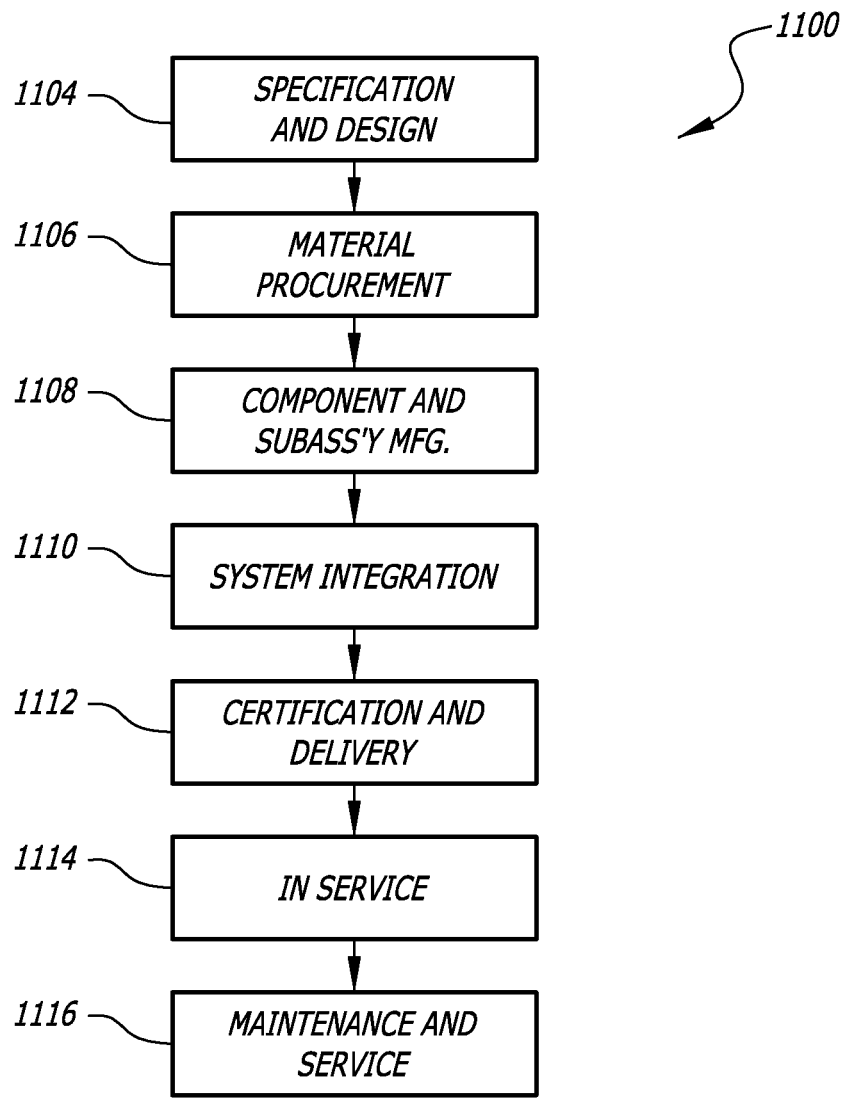

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of a reverse spot-facing tool, according to one or more examples of the present disclosure;

FIG. 1B is a second portion of the block diagram of the reverse spot-facing tool, according to one or more examples of the present disclosure;

FIG. 2 is a schematic, side elevational, environmental view of the reverse spot-facing tool of FIGS. 1A and 1B, according to one or more examples of the present disclosure;

FIG. 3A is a schematic sectional view of a workpiece-engaging member of the reverse spot-facing tool of FIGS. 1A and 1B, according to one or more examples of the present disclosure;

FIG. 3B is a schematic sectional view of a workpiece-engaging member of the reverse spot-facing tool of FIGS. 1A and 1B, according to one or more examples of the present disclosure;

FIG. 4A is a schematic perspective exploded view of a biasing assembly of the reverse spot-facing tool of FIGS. 1A and 1B, according to one or more examples of the present disclosure;

FIG. 4B is a schematic perspective exploded view of a biasing assembly of the reverse spot-facing tool of FIGS. 1A and 1B, according to one or more examples of the present disclosure;

FIG. 4C is a schematic perspective exploded view of a biasing assembly of the reverse spot-facing tool of FIGS. 1A and 1B, according to one or more examples of the present disclosure;

FIG. 4D is a schematic perspective exploded view of a biasing assembly of the reverse spot-facing tool of FIGS. 1A and 1B, according to one or more examples of the present disclosure;

FIG. 5 is a schematic side elevational view of a workpiece-engaging member of the reverse spot-facing tool of FIGS. 1A and 1B, according to one or more examples of the present disclosure;

FIG. 6 is a schematic exploded, perspective view of the reverse spot-facing tool of FIGS. 1A and 1B, according to one or more examples of the present disclosure;

FIG. 7 is a schematic, sectional view of a biasing assembly of the reverse spot-facing tool of FIGS. 1A and 1B, according to one or more examples of the present disclosure;

FIG. 8 is a schematic perspective view of a reverse spot-facing cutter and pilot shaft of the reverse spot-facing tool of FIGS. 1A and 1B, according to one or more examples of the present disclosure;

FIG. 9 is a schematic perspective view of a pilot shaft of the reverse spot-facing tool of FIGS. 1A and 1B, according to one or more examples of the present disclosure;

FIG. 10 is a block diagram of a method of cutting a reverse spot-face, according to one or more examples of the present disclosure;

FIG. 11 is a block diagram of aircraft production and service methodology; and

Figure 12:
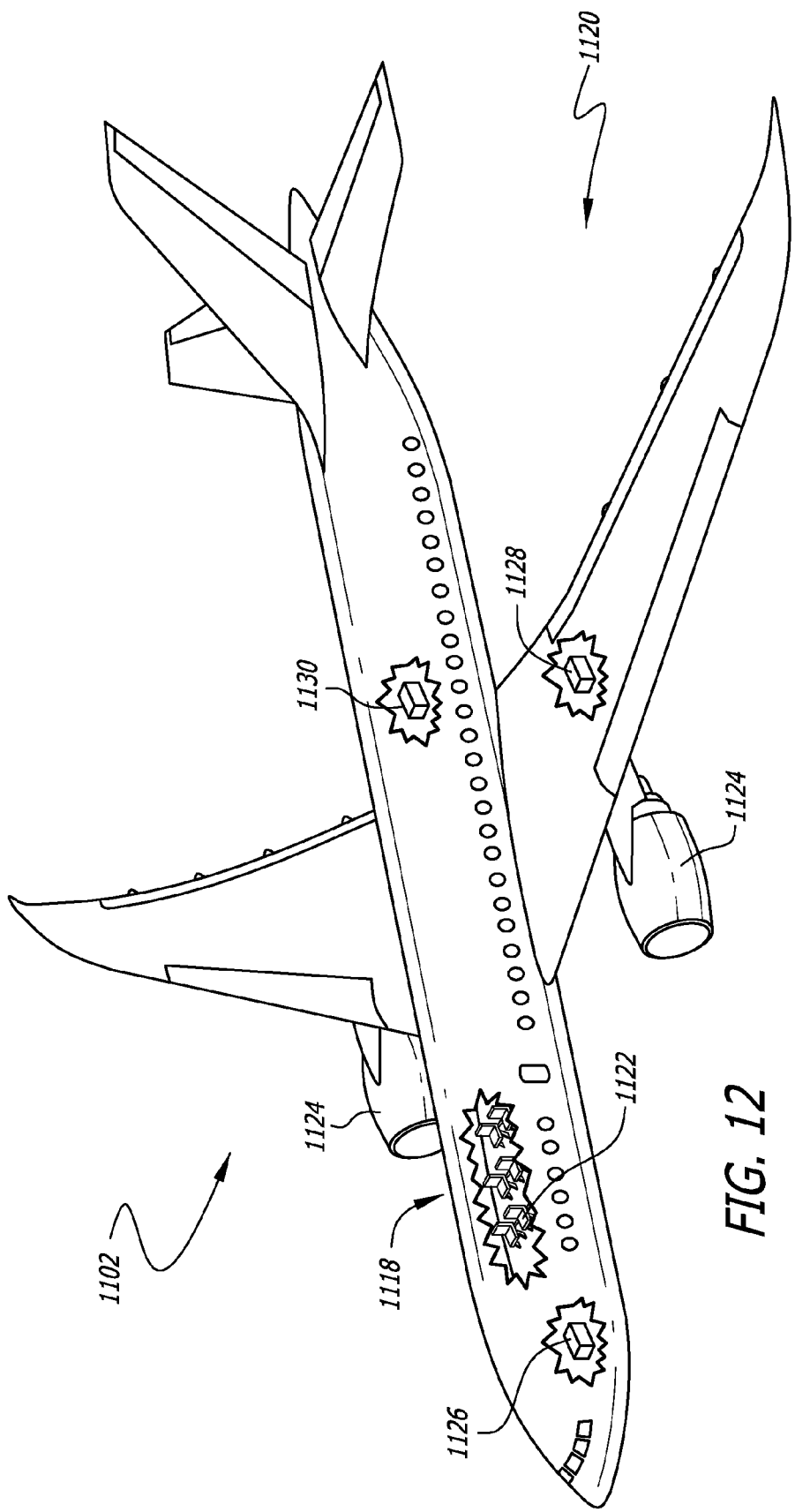

FIG. 12 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 1A, 1B, and 11, referred to above, the blocks may represent operations and/or portions thereof and lines connecting the various blocks do not imply any particular order or dependency of the operations or portions thereof. FIGS. 1A, 1B, and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g., to FIGS. 1A, 1B, 2, and 6, the instant paragraph pertains to example 1 of the present disclosure. Example 1 relates to reverse spot-facing tool 100 for cutting reverse spot-face R in workpiece W using reverse spot-facing cutter 102 configured to engage pilot shaft 104 having first end 101 and second end 105. In example 1, workpiece W comprises a through hole H having central axis A. Reverse spot-facing tool 100 comprises stop 132 configured to be located between first end 101 and second end 105 of pilot shaft 104; biasing assembly 109 that generates first thrust force F1 and second thrust force F2 equal and opposite to first thrust force F1 when reverse spot-facing cutter 102 is cutting reverse spot face R; and thrust bearing 126 configured to be positioned between biasing assembly 109 and stop 132. When reverse spot-facing cutter 102 is cutting reverse spot-face R, thrust bearing 126 transmits second thrust force F2 from biasing assembly 109 to stop 132, and biasing assembly 109 transmits first thrust force F1 to workpiece W.

Central axis A of hole H is coincident with the drilling axis from forming hole H. The purpose of stop 132 is to provide a vehicle for transmitting second thrust force F2 to pilot shaft 104.

Transmission of forces F1 and F2 respectively to workpiece W and pilot shaft 104 eliminates the need for having the worker constantly pull on drill D to cause reverse spot-facing cutter 102 to bear against workpiece W during cutting. Worker fatigue and demands on worker attention are thus decreased.

Referring generally to FIGS. 1A and 1B and particularly to e.g. FIGS. 2, 4A-4D, 6, and 7, the instant paragraph pertains to example 2 of the present disclosure. In example 2, which includes the subject matter of example 1, biasing assembly 109 comprises workpiece-engaging member 110, in turn comprising third end 161 configured to face workpiece W, fourth end 163 opposite third end 161 and configured to face stop 132, and second through opening 112 extending between third end 161 and fourth end 163. Second through opening 112 has first wall 127. The workpiece-engaging member 110 further comprises first abutment surface 116 configured to engage workpiece W. Biasing assembly 109 also comprises stop-engaging member 118, in turn comprising fifth end 165 configured to face workpiece W, sixth end 167 opposite fifth end 165 and configured to face stop 132, and third through opening 122 extending between fifth end 165 and sixth end 167. Third through opening 122 has second wall 129. The stop-engaging member 118 further comprises second abutment surface 169 configured to engage thrust bearing 126. Workpiece-engaging member 110 and stop-engaging member 118 are configured to be adjustably interconnected.

Adjustable interconnection of workpiece-engaging member 110 and stop-engaging member 118 enables first and second thrust forces F1, F2 to be generated.

Reference to components of reverse spot-facing tool 100 as being configured to face workpiece W or stop 132 is predicated on reverse spot-facing tool 100 being in an operable condition, installed on workpiece W (e.g., as in FIG. 2). Reference to components of reverse spot-facing tool 100 as being configured to engage another component refers to the order in which these components are assembled when the reverse spot-facing tool 100 is installed on workpiece W, and encompasses abutment of components and/or environmental elements with reverse spot-facing tool 100 in an assembled condition.

Biasing assembly 109 fits over pilot shaft 104 and between workpiece W and stop 104, thereby being able to transmit first and second thrust forces F1, F2 to workpiece W and stop 132, and thereby creating preload 144 (see FIGS. 1B and 2), as will be described hereinafter.

Referring generally to FIGS. 1A and 1B and particularly to e.g. FIG. 2, the instant paragraph pertains to example 3 of the present disclosure. In example 3, which includes the subject matter of example 2, when reverse spot-facing cutter 102 is cutting reverse spot face R, thrust bearing 126 transmits second thrust force F2 from second abutment surface 169 of stop-engaging member 118 to stop 132. First abutment surface 116 of workpiece-engaging member 110 transmits first thrust force F1 to workpiece W.

Thrust bearing 126 transmits second thrust force F2 to stop 132 so that, with pilot shaft 104 pulling on reverse spot-face cutter 102, preload 144 is created. Simultaneously, rotation of pilot shaft 104 relative to biasing assembly 109 when cutting reverse spot-face 102 and when adjusting biasing assembly 109 is accommodated by thrust bearing 126, thereby also minimizing wear of stop 132 and biasing assembly 109.

Referring generally to FIGS. 1A and 1B and particularly to e.g. FIG. 7, the instant paragraph pertains to example 4 of the present disclosure. In example 4, which includes the subject matter of any of examples 2 and 3, at least a portion of first wall 127 of second through opening 112 of workpiece-engaging member 110 is smooth. At least a portion of second wall 129 of third through opening 122 of stop-engaging member 118 is smooth.

Smooth portions of first and second walls 127, 129, enable a close, sliding fit of pilot shaft 104 with biasing assembly 109, thereby providing the required alignment of pilot shaft 104 for cutting reverse spot-face R.

Still referring generally to FIGS. 1A and 1B and particularly to e.g. FIG. 7, the instant paragraph pertains to example 5 of the present disclosure. In example 5, which includes the subject matter of any of examples 2 and 3, second through opening 112 of workpiece-engaging member 110 comprises linear bearing 176.

The service lives of workpiece-engaging member 110 and pilot shaft 104, which rotates relative to the workpiece-engaging member 110 during cutting of reverse spot-face R, may be extended by using linear bearing 176.

Continuing to refer generally to FIGS. 1A and 1B, and particularly to e.g. FIG. 7, the instant paragraph pertains to example 6 of the present disclosure. In example 6, which includes the subject matter of any of examples 2, 3, and 5, third through opening 122 of stop-engaging member 118 comprises linear bearing 178.

The service lives of stop-engaging member 118 and pilot shaft 104, which rotates relative to the stop-engaging member 118 during cutting of reverse spot-face R, may be extended by using linear bearing 178.

Referring generally to FIGS. 1A and 1B and particularly to e.g. FIGS. 2, 3A-3B, 4A-4D, and 7, the instant paragraph pertains to example 7 of the present disclosure. In example 7, which includes the subject matter of any of examples 2-6, pilot shaft 104 has a sliding fit with second through opening 112 of workpiece-engaging member 110.

A close, sliding fit of pilot shaft 104 within second through opening 112 of workpiece-engaging member 110 promotes proper alignment of reverse spot-facing cutter 102 relative to workpiece W.

Continuing to refer generally to FIGS. 1A and 1B and particularly to e.g. FIGS. 2, 3A-3B, 4A-4D, and 7, the instant paragraph pertains to example 8 of the present disclosure. In example 8, which includes the subject matter of any of examples 2-7, pilot shaft 104 has a sliding fit with third through opening 122 of stop-engaging member 118.

A close, sliding fit of pilot shaft 104 within third through opening 122 of stop-engaging member 118 promotes proper alignment of reverse spot-facing cutter 102 to workpiece W.

Referring generally to FIGS. 1A and 1B and particularly to e.g. FIGS. 2, 4A-4D, 6, and 7, the instant paragraph pertains to example 9 of the present disclosure. In example 9, which includes the subject matter of any of examples 2-8, biasing assembly 109 comprises threaded coupling 120 between workpiece-engaging member 110 and stop-engaging member 118. Threaded coupling 120 is infinitely adjustable along its length.

The length of threaded coupling 120 refers to an extent along which threads 120A of workpiece-engaging member 110 mesh with threads 120B of stop-engaging member 118. This length is variable, depending upon the extent to which stop-engaging member 118 has been threaded into workpiece engaging member 110. The length of threaded coupling 120 defines a range of adjustment provided by biasing assembly 109. Infinite adjustability of threaded coupling 120 along the available range of adjustment enables precise control of the magnitude of preload on reverse spot-facing cutter 102.

Referring generally to FIGS. 1A and 1B and particularly to e.g. FIGS. 2, 4A-4D, 6, and 7, the instant paragraph pertains to example 10 of the present disclosure. In example 10, which includes the subject matter of any of examples 2-9, workpiece-engaging member 110 further comprises first rotational engagement feature 139.

First rotational engagement feature 139 promotes positive manual grasp of workpiece-engaging member 110 when rotating workpiece-engaging member 110 relative to stop-engaging member 118 to generate first and second thrust forces F1, F2, corresponding to desired preload 144. Manual grasping of workpiece-engaging member 110 is a convenient alternative to using a tool, such as a wrench (not shown).

Those skilled in the art will appreciate that first rotational engagement feature 139 broadly encompasses a number of specific forms, several of which are described hereinafter. The same holds true for second rotational engagement feature 141, and for first and second interlock features 138, 143, all to be described below.

Referring generally to FIGS. 1A and 1B and particularly to e.g. FIG. 4A, the instant paragraph pertains to example 11 of the present disclosure. In example 11, which includes the subject matter of example 10, first rotational engagement feature 139 comprises first friction surface 139B.

First friction surface 139B enables slip-resistant manual grasp of stop-engaging member 118. First friction surface 139B may comprise knurling, ridging, application of a light tack adhesive, application of a high friction rubber or other coating, and other treatments.

Referring generally to FIGS. 1A and 1B and particularly to e.g. FIGS. 2 and 4C-4D, the instant paragraph pertains to example 12 of the present disclosure. In example 12, which includes the subject matter of example 10, first rotational engagement feature 139 comprises first handle 139A projecting from workpiece-engaging member 110.

First handle 139A enables positive manual grasp of workpiece-engaging member 110 when adjusting preload 144 and increases leverage available to rotate workpiece-engaging member 110 compared to the use of first friction surface 139B, for example.

Referring generally to FIGS. 1A and 1B and particularly to e.g. FIGS. 3A-3B, 4B-4D, 6, and 7, the instant paragraph pertains to example 13 of the present disclosure. In example 13, which includes the subject matter of example 10, first rotational engagement feature 139 comprises first interlock feature 138.

First interlock feature 138 accommodates engagement of workpiece-engaging member 110 by an implement such as a tool or handle, rather than by direct manual grasp, to rotate stop-engaging member 118 relative to workpiece-engaging member 110 when adjusting first and second thrust forces F1, F2, and hence preload 144.

Referring generally to FIGS. 1A and 1B and particularly to e.g. FIGS. 3A-3B, 4B, 5, and 6, the instant paragraph pertains to example 14 of the present disclosure. In example 14, which includes the subject matter of example 13, first interlock feature 138 comprises first opposed, substantially parallel wrench surfaces 138A.

As used herein, "substantially parallel" means parallel within manufacturing tolerances, or alternatively, usable with wrenches having nominally parallel opposing jaw surfaces. First opposed, substantially parallel wrench surfaces 138A enable grasp of workpiece-engaging member 110 by a wrench when adjusting first and second thrust forces F1, F2, and hence preload 144.

Referring generally to FIGS. 1A and 1B and particularly to e.g. FIGS. 2, 4C-4D, and 7, the instant paragraph pertains to example 15 of the present disclosure. In example 15, which includes the subject matter of example 13, first interlock feature 138 comprises first engagement recess 138B.

First engagement recess 138B is any recess other than first opposed, substantially parallel wrench surfaces 138A in workpiece-engaging member 110. First engagement recess 138B receives an implement, such as a rod or a handle, enabling an operator to hold workpiece-engaging member 110 in place, or alternatively, to rotate workpiece-engaging member 110 relative to stop-engaging member 118 when adjusting the preload. First engagement recess 138B may be a threaded hole, for example, to receive first handle 139A, or in another example, may be a groove to receive a tool resembling a tuning fork (this option is not shown), among other possibilities.

Referring generally to FIGS. 1A and 1B and particularly to e.g. FIGS. 2, 4A, 4C, 4D, 6 and 7, the instant paragraph pertains to example 16 of the present disclosure. In example 16, which includes the subject matter of any of examples 2-15, stop-engaging member 118 further comprises second rotational engagement feature 141.

Second rotational engagement feature 141 facilitates manual grasp of stop-engaging member 118 to accomplish mutual rotation of workpiece-engaging member 110 and stop-engaging member 118 for generating first and second thrust forces F1, F2, thereby setting preload 144 to an appropriate value.

Referring generally to FIGS. 1A and 1B and particularly to e.g. FIGS. 4A, 4C, and 7, the instant paragraph pertains to example 17 of the present disclosure. In example 17, which includes the subject matter of example 16, second rotational engagement feature 141 comprises second friction surface 141B on stop-engaging member 118.

Second friction surface 141B enables slip-resistant manual grasp of stop-engaging member 118 when adjusting biasing assembly 109 to generate first and second thrust forces F1, F2, thus setting preload 144. Second friction surface 141B may comprise knurling, ridging, application of a light tack adhesive, application of a high friction rubber or other coating, and other treatments.

Referring generally to FIGS. 1A and 1B and particularly to e.g. FIG. 2, the instant paragraph pertains to example 18 of the present disclosure. In example 18, which includes the subject matter of example 16, second rotational engagement feature 141 comprises second handle 141A projecting from stop-engaging member 118.

Second handle 141A enables positive manual grasp of stop-engaging member 118 when adjusting biasing assembly 109 to generate first and second thrust forces F1, F2, thereby setting preload 144 to an appropriate value.

Referring generally to FIGS. 1A and 1B and particularly to e.g. FIGS. 4B, 4D, and 6, the instant paragraph pertains to example 19 of the present disclosure. In example 19, which includes the subject matter of example 16, second rotational engagement feature 141 comprises second interlock feature 143.

Second interlock feature 143 accommodates rotation of stop-engaging member 118 relative to workpiece-engaging member 110 by an implement such as a tool or a handle, rather than via direct manual grasp.

Referring generally to FIGS. 1A and 1B and particularly to e.g. FIGS. 4B and 4D, the instant paragraph pertains to example 20 of the present disclosure. In example 20, which includes the subject matter of example 19, second interlock feature 143 comprises second opposed, substantially parallel wrench surfaces 143B.

Second opposed, substantially parallel wrench surfaces 143B enable grasp of stop-engaging member 118 by a wrench when adjusting biasing assembly 109 to set preload 144.

Referring generally to FIGS. 1A and 1B and particularly to e.g. FIG. 2, the instant paragraph pertains to example 21 of the present disclosure. In example 21, which includes the subject matter of example 19, second interlock feature 143 comprises second engagement recess 143A.

Second engagement recess 143A is any recess other than second opposed, substantially parallel wrench surfaces 143B in stop-engaging member 118, which receives or engages an implement, such as a rod or handle, enabling a worker to hold stop-engaging member 118 in place, or alternatively, to rotate stop-engaging member 118 relative to workpiece-engaging member 110 when adjusting preload 144. Second engagement recess 143A may be a threaded hole (not shown), for example, to receive second handle 141A where the latter has a threaded attachment shank, or for example, may be a groove to receive a tool resembling a tuning fork (this option is not shown), among other possibilities (none shown).

Referring generally to FIGS. 1A and 1B and particularly to e.g. FIG. 2, the instant paragraph pertains to example 22 of the present disclosure. In example 22, which includes the subject matter of any of examples 1-21, reverse spot-facing cutter 102 and biasing assembly 109 are on opposite sides of workpiece W when reverse spot-facing cutter 102 is cutting reverse spot face R.

Accordingly, opposing first and second thrust forces F1, F2, capable of being generated by biasing assembly 109 along central axis A, create preload 144 without requiring the operator to exert a pulling force on second end 105 of pilot shaft 104.

Referring generally to FIGS. 1A and 1B and particularly to e.g. FIG. 5, the instant paragraph pertains to example 23 of the present disclosure. In example 23, which includes the subject matter of any of examples 2-21, workpiece-engaging member 110 has first maximum transverse dimension 156 at first abutment surface 116, and second maximum transverse dimension 158 away from first abutment surface 116. Second maximum transverse dimension 158 is greater in magnitude than first maximum transverse dimension 156.

Accordingly, depending on the geometry of the workpiece W, access to workpiece W may be improved.

Referring generally to FIGS. 1A and 1B and particularly to e.g. FIG. 5, the instant paragraph pertains to example 24 of the present disclosure. In example 24, which includes the subject matter of any of examples 2-23, workpiece-engaging member 110 further comprises guide surface 160 configured to center pilot shaft 104 relative to through hole H in workpiece W when reverse spot-facing tool 100 is installed on workpiece W.

Guide surface 160 occupies hole H with close fit thereto. Centering pilot shaft 104 relative to hole H using workpiece-engaging member 110 eliminates the need for separately centering reverse spot-facing cutter 102 relative to workpiece W.

Still referring generally to FIGS. 1A and 1B and particularly to e.g. FIG. 5, the instant paragraph pertains to example 25 of the present disclosure. In example 25, which includes the subject matter of example 24, workpiece-engaging member 110 further comprises tapered external surface 164 adjacent guide surface 160.

Accordingly, depending on the geometry of the workpiece W, access to workpiece W may be improved.

Referring generally to FIGS. 1A and 1B and particularly to e.g. FIG. 2, the instant paragraph pertains to example 26 of the present disclosure. In example 26, which includes the subject matter of any of examples 24 and 25, guide surface 160 is configured to align pilot shaft 104 with central axis A of through hole H.

Aligning pilot shaft 104 with central axis A promotes making reverse spot-face R perpendicular to central axis A of hole H. Aligning pilot shaft 104 with central axis A using workpiece-engaging member 110 eliminates the need for a separately aligning and/or centering reverse spot-facing cutter 102 relative to workpiece W.

Still referring generally to FIGS. 1A and 1B and particularly to e.g. FIG. 2, the instant paragraph pertains to example 27 of the present disclosure. In example 27, which includes the subject matter of any of examples 24-26, guide surface 160 is configured to have a sliding fit with through hole H.

Sliding fit enables mutual alignment of biasing assembly 109 with workpiece W.

Referring generally to FIGS. 1A and 1B and particularly to e.g. FIG. 9, the instant paragraph pertains to example 28 of the present disclosure. In example 28, which includes the subject matter of any of examples 1-27, stop 132 is monolithic with pilot shaft 104.

Making stop 132 monolithic with pilot shaft 104 eliminates an assembly step (that of locking separate stop 132 to pilot shaft 104) when installing reverse spot-facing tool 100 on workpiece W.

Referring generally to FIGS. 1A and 1B and particularly to e.g. FIG. 6, the instant paragraph pertains to example 29 of the present disclosure. In example 29, which includes the subject matter of any of examples 1-27, stop 132 comprises first through opening 152, configured to receive pilot shaft 104, and lock 154, configured to fix stop 132 along pilot shaft 104.

Lock 154 may comprise setscrew 155, for example. Setscrew 155 may be driven by allen wrench T. In example 29, stop 132 is separate from pilot shaft 104, which enables reverse spot-facing tool 100 to utilize a pre-existing or conventional pilot shaft 104 and reverse spot-facing cutter 102.

Referring generally to FIGS. 1A and 1B and particularly to e.g. FIG. 9, the instant paragraph pertains to example 30 of the present disclosure. In example 30, which includes the subject matter of example 29, first through opening 152 of stop 132 is configured to have a sliding fit with pilot shaft 104.

This arrangement e.g. stabilizes stop 132 against potential wobble on pilot shaft 104 when installed thereon, which in turn increases security of setscrew 155.

Referring e.g., to FIGS. 1A, 1B, 2, and 6, the instant paragraph pertains to example 31 of the present disclosure. Example 31 relates to reverse spot-facing tool 100 for cutting reverse spot-face R in workpiece W. In example 31, workpiece W comprises through hole H having central axis A. Reverse spot-facing tool 100 comprises pilot shaft 104; reverse spot-facing cutter 132 configured to be coupled to pilot shaft 104; and stop 132. Stop 132 comprises first through opening 152, configured to receive pilot shaft 104, and lock 154, configured to fix stop 132 along pilot shaft 104. Reverse spot-facing tool 100 also comprises thrust bearing 126 and biasing assembly 109 that generates first thrust force F1 and second thrust force F2 equal and opposite to first thrust force F1 when reverse spot-facing cutter 102 is cutting reverse spot-face R. Biasing assembly 109 comprises workpiece-engaging member 110, in turn comprising third end 161 configured to face workpiece W, fourth end 163 opposite end 161 and configured to face stop 132, and second through opening 112 extending between third end 161 and fourth end 163. Second through opening 112 is bounded by first wall 127. Workpiece-engaging member 110 also comprises first abutment surface 116 configured to engage workpiece W. Biasing assembly 109 also comprises stop-engaging member 118, in turn comprising fifth end 165 configured to face workpiece W, sixth end 167 opposite fifth end 165 and configured to face stop 132, and third through opening 122 extending between fifth end 165 and sixth end 167. Third through opening 122 is bounded by second wall 129. Stop-engaging member 118 further comprises second abutment surface 169 configured to engage thrust bearing 126. Thrust bearing 126 is configured to be positioned between biasing assembly 109 and stop 132. Workpiece-engaging member 110 and stop-engaging member 118 are configured to be adjustably interconnected. When reverse spot-facing cutter 102 is cutting reverse spot-face R, thrust bearing 126 transmits second thrust force F2 from biasing assembly 109 to stop 132 and biasing assembly 109 transmits first thrust force F1 to workpiece W.

Transmission of forces F1 and F2 respectively to workpiece W and pilot shaft 104 eliminates the need for having the worker constantly pull on drill D to cause reverse spot-facing cutter 102 to bear against workpiece W during cutting. Worker fatigue and demands on worker attention are thus decreased.

Referring generally to FIGS. 1A and 1B and particularly to e.g. FIG. 6, the instant paragraph pertains to example 32 of the present disclosure. In example 32, which includes the subject matter of example 31, reverse spot-facing cutter 102 and pilot shaft 104 include a mechanical interlock 107 configured to demountably couple reverse spot-facing cutter 102 to pilot shaft 104.

Mechanical interlock 107, schematically depicted herein as a bayonet connection, may include interfit characteristics of bayonet connections, but may take forms other than that depicted. Mechanical interlock 107 assures retention of reverse spot-facing cutter 102 to pilot shaft 104 when cutting reverse spot-face R.

Referring generally to FIGS. 1A and 1B and particularly to e.g. FIG. 8, the instant paragraph pertains to example 33 of the present disclosure. In example 33, which includes the subject matter of example 31, reverse spot-facing cutter 102 and pilot shaft 104 are monolithically interconnected.

Making stop 132 monolithic with pilot shaft 104 eliminates an assembly step (that of locking separate stop 132 to pilot shaft 104) when installing reverse spot-facing tool 100 on workpiece W.

Referring e.g., to FIGS. 1A, 1B, 2, 6, and 10, the instant paragraph pertains to example 34 of the present disclosure. Example 34 relates to method 200 of cutting reverse spot-face R in workpiece W. Workpiece W comprises obverse side 140, reverse side 142, and through hole H with central axis A. In example 34, method 200 comprises installing pilot shaft 104 in through hole H, such that stop 132 is along pilot shaft 104 on obverse side 140 of workpiece W, biasing assembly 109 is along pilot shaft 104 between workpiece W and stop 132, and thrust bearing 126 is between biasing assembly 109 and stop 132 (block 202). Method 200 further comprises attaching reverse spot-facing cutter 102 to pilot shaft 104 on reverse side 142 of workpiece W (block 204); biasing reverse spot-facing cutter 102 against reverse side 142 of workpiece W with preload 144 by generating first thrust force F1 against obverse side 140 of workpiece W and second thrust force F2 opposite first thrust force F1 against stop 132 by adjusting biasing assembly 109 (block 206); and rotating reverse spot-facing cutter 102 via pilot shaft 104 (block 208).

Reverse spot-face R is thereby created without obliging a worker to constantly pull on drill D to cause reverse spot-facing cutter 102 to bear against workpiece W during cutting. Worker fatigue and demands on worker attention are thus decreased.

Continuing to refer generally to FIGS. 1A, 1B, 2, and 6, and particularly to e.g. FIG. 10, the instant paragraph pertains to example 35 of the present disclosure. In example 35, which includes the subject matter of example 34, method 200 further comprises aligning reverse spot-facing cutter 102 with central axis A of through hole H using biasing assembly 109 (block 210).

Using biasing assembly 109 for alignment eliminates the need for a separate centering step, thereby simplifying reverse spot-facing operation.

Continuing to refer generally to FIGS. 1A, 1B, 2, and 6, and particularly to e.g. FIG. 10, the instant paragraph pertains to example 36 of the present disclosure. In example 36, which includes the subject matter of any of examples 34 and 35, method 200 further comprises progressively reducing preload 144 responsive to advancing reverse spot-facing cutter 102 into workpiece W while rotating reverse spot-facing cutter 102 (block 212).

Reducing preload 144 responsive to advancing reverse spot-facing cutter 102 into the workpiece automatically terminates cutting of reverse spot-face R.

Continuing to refer generally to FIGS. 1A, 1B, 2, and 6, and particularly to e.g. FIG. 10, the instant paragraph pertains to example 37 of the present disclosure. In example 37, which includes the subject matter of example 36, method 200 further comprises terminating preload 144 when first thrust force F1 and second thrust force F2 fully dissipate (block 214).

Terminating preload 144 when first and second thrust forces F1 and F2 fully dissipate provides automatic control of the cutting depth.

Continuing to refer generally to FIGS. 1A, 1B, 2, and 6, and particularly to e.g. FIG. 10, the instant paragraph pertains to example 38 of the present disclosure. In example 38, which includes the subject matter of any of examples 34-37, rotating reverse spot-facing cutter 102 via pilot shaft 104 comprises rotating pilot shaft 104 with rotary drive D (block 216).

Rotary drive D may be an electric hand drill, or alternatively, may be a drive utilizing pneumatic or hydraulic pressure, spring force, manual force, and other sources of power. Using a rotary drive, such as described above, enables selection of a particular cutting speed required for a given operation.

Examples of the present disclosure may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A reverse spot-facing tool (100) for cutting a reverse spot-face (R) in a workpiece (W) using a reverse spot-facing cutter (102), comprising a cutting edge and configured to engage a pilot shaft (104) having a first end (101) and a second end (105), the workpiece (W) comprising a through hole (H) having a central axis (A), the reverse spot-facing tool (100) comprising:
    a stop (132) configured to be located between the first end (101) and the second end (105) of the pilot shaft (104);
    a biasing assembly (109) that generates a first thrust force (F1) and a second thrust force (F2) equal and opposite to the first thrust force (F1) when the reverse spot-facing cutter (102) is cutting the reverse spot face (R) wherein the biasing assembly (109) comprises:
    a workpiece-engaging member (110) comprising:
        a third end (161) configured to face the workpiece (W),
        a fourth end (163) opposite the third end (161) and configured to face the stop (132),
        a second through opening (112) extending between the third end (161) and the fourth end (163), wherein the second through opening (112) has a first wall (127), and
        a first abutment surface (116) configured to engage the workpiece (W); and
    a stop-engaging member (118) comprising:
        a fifth end (165) configured to face the workpiece (W),
        a sixth end (167) opposite the fifth end (165) and configured to face the stop (132),
        a third through opening (122) extending between the fifth end (165) and the sixth end (167), wherein the third through opening (122) has a second wall (129), and
        a second abutment surface (169) configured to engage the thrust bearing (126),
    wherein the workpiece-engaging member (110) and the stop-engaging member (118) are configured to be adjustably interconnected; and
    a thrust bearing (126) configured to be positioned between the biasing assembly (109) and the stop (132),
    wherein, when the reverse spot-facing cutter (102) is cutting the reverse spot-face (R), the pilot shaft (104) is co-axial with the central axis (A), the cutting edge of the spot-facing cutter (102) is substantially perpendicular to the central axis (A), the thrust bearing (126) transmits the second thrust force (F2) from the biasing assembly (109) to the stop (132), and the biasing assembly (109) transmits the first thrust force (F1) to the workpiece (W).

2. The reverse spot-facing tool (100) of claim 1, wherein, when the reverse spot-facing cutter (102) is cutting the reverse spot face (R), the thrust bearing (126) transmits the second thrust force (F2) from the second abutment surface (169) of the stop-engaging member (118) to the stop (132), and the first abutment surface (116) of the workpiece-engaging member (110) transmits the first thrust force (F1) to the workpiece (W).

3. The reverse spot-facing tool (100) of claim 1, wherein the second through opening (112) of the workpiece engaging member (110) comprises a linear bearing (176).

4. The reverse spot-facing tool (100) of claim 1, wherein the third through opening (122) of the stop-engaging member (118) comprises a linear bearing (178).

5. The reverse spot-facing tool (100) of claim 1, wherein the biasing assembly (109) comprises a threaded coupling (120) between the workpiece-engaging member (110) and the stop-engaging member (118), wherein the threaded coupling (120) is infinitely adjustable along its length.

6. The reverse spot-facing tool (100) of claim 1, wherein the workpiece-engaging member (110) further comprises a first rotational engagement feature (139).

7. The reverse spot-facing tool (100) of claim 1, wherein the stop-engaging member (118) further comprises a second rotational engagement feature (141).

8. The reverse spot-facing tool (100) of claim 1, wherein the reverse spot-facing cutter (102) and the biasing assembly (109) are on opposite sides of the workpiece (W) when the reverse spot-facing cutter (102) is cutting the reverse spot face (R).

9. The reverse spot-facing tool (100) of claim 1, wherein the workpiece-engaging member (110) has a first maximum transverse dimension (156) at the first abutment surface (116), and a second maximum transverse dimension (158) away from the first abutment surface (116), wherein the second maximum transverse dimension (158) is greater in magnitude than the first maximum transverse dimension (156).

10. The reverse spot-facing tool (100) of claim 1, wherein the workpiece-engaging member (110) further comprises a guide surface (160) configured to center the pilot shaft (104) relative to the through hole (H) in the workpiece W when the reverse spot-facing tool (100) is installed on the workpiece (W).

11. The reverse spot-facing tool (100) of claim 10, wherein the guide surface (160) is configured to align the pilot shaft (104) with the central axis (A) of the through hole (H).

12. The reverse spot-facing tool (100) of claim 1, wherein the stop (132) is monolithic with the pilot shaft (104).

13. The reverse spot-facing tool (100) of claim 1, wherein the stop (132) comprises:
 a first through opening (152) configured to receive the pilot shaft (104); and
 a lock (154) configured to fix the stop (132) along the pilot shaft (104).

14. A reverse spot-facing tool (100) for cutting a reverse spot-face (R) in a workpiece (W), the workpiece (W) comprising a through hole (H) having a central axis (A), the reverse spot-facing tool (100) comprising:
 a pilot shaft (104);
 a reverse spot-facing cutter (102), comprising a cutting edge and configured to be coupled to the pilot shaft (104) wherein the pilot shaft (104) is co-axial with the central axis (A), the cutting edge of the spot-facing cutter (102) is substantially perpendicular to the central axis (A);
 a stop (132) comprising:
  a first through opening (152) configured to receive the pilot shaft (104), and
  a lock (154) configured to fix the stop (132) along the pilot shaft (104);
 a thrust bearing (126); and
 a biasing assembly (109) that generates a first thrust force (F1) and a second thrust force (F2) equal and opposite to the first thrust force (F1) when the reverse spot-facing cutter (102) is cutting the reverse spot-face (R), wherein the biasing assembly (109) comprises:
  a workpiece-engaging member (110) comprising:
   a third end (161) configured to face the workpiece (W),
   a fourth end (163) opposite the third end (161) and configured to face the stop (132),
   a second through opening (112) extending between the third end (161) and the fourth end (163), wherein the second through opening (112) is bounded by a first wall (127), and
   a first abutment surface (116) configured to engage the workpiece (W);
  a stop-engaging member (118) comprising:
   a fifth end (165) configured to face the workpiece (W),
   a sixth end (167) opposite the fifth end (165) and configured to face the stop (132),
   a third through opening (122) extending between the fifth end (165) and the sixth end (167), wherein the third through opening (122) is bounded by a second wall (129), and
   a second abutment surface 169 configured to engage the thrust bearing (126); wherein
 the thrust bearing (126) is configured to be positioned between the biasing assembly (109) and the stop (132),
 the workpiece-engaging member (110) and the stop-engaging member (118) are configured to be adjustably interconnected, and
 when the reverse spot-facing cutter (102) is cutting the reverse spot-face (R), the thrust bearing (126) transmits the second thrust force (F2) from the biasing assembly (109) to the stop (132), and the biasing assembly (109) transmits the first thrust force (F1) to the workpiece (W).

15. The reverse spot-facing tool (100) of claim 14, wherein the reverse spot-facing cutter (102) and the pilot shaft (104) are monolithically interconnected.

* * * * *